US012572409B2

(12) United States Patent
Koren et al.

(10) Patent No.: US 12,572,409 B2
(45) Date of Patent: Mar. 10, 2026

(54) IDENTIFYING ANOMALOUS PORTIONS OF INPUT/OUTPUT PATHS BY MONITORING CHECKPOINTS OF INPUT/OUTPUT OPERATIONS THROUGH A STORAGE SYSTEM

(71) Applicant: Dell Products L.P., Round Rock, TX (US)

(72) Inventors: Dvir Koren, Nahalal (IL); Tal Abir, Nesher (IL)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/668,740

(22) Filed: May 20, 2024

(65) Prior Publication Data

US 2025/0355749 A1      Nov. 20, 2025

(51) Int. Cl.
| | |
|---|---|
| *G06F 11/00* | (2006.01) |
| *G06F 11/07* | (2006.01) |
| *G06F 11/30* | (2006.01) |

(52) U.S. Cl.
CPC ........ *G06F 11/079* (2013.01); *G06F 11/0745* (2013.01); *G06F 11/3041* (2013.01)

(58) Field of Classification Search
CPC ................................................. G06F 11/3041
See application file for complete search history.

(56) References Cited

U.S. PATENT DOCUMENTS

| | | | | |
|---|---|---|---|---|
| 2014/0359641 A1* | 12/2014 | Clark | ................. | G06F 11/3041 |
| | | | | 719/318 |
| 2021/0099373 A1* | 4/2021 | Kapoor | ............... | H04L 43/0852 |
| 2023/0185648 A1* | 6/2023 | Mishra | ............... | G06F 11/3041 |

(Continued)

OTHER PUBLICATIONS

Chou et al., "Testing Inter-Word Coupling Faults of Wide I/O DRAMs," 2015 IEEE 24th Asian Test Symposium (ATS), Mumbai, India, 2015, pp. 67-72 (Year: 2015).*

(Continued)

*Primary Examiner* — Bryce P Bonzo
*Assistant Examiner* — Gabriella Kanani Shelton
(74) *Attorney, Agent, or Firm* — Ryan, Mason & Lewis, LLP

(57) ABSTRACT

Techniques are provided for identifying anomalous portions of input/output (I/O) paths by monitoring checkpoints of I/O operations through a storage system. One method comprises obtaining checkpoint data associated with designated storage volumes in a storage system that comprises designated storage system components. The checkpoint data may be associated with multiple I/O operations that are processed by the designated storage system components and the checkpoint data for a given I/O operation may comprise checkpoint times indicating respective times that the given I/O operation is processed by a corresponding designated storage system component. A time difference between two checkpoint times may be evaluated to identify anomalous portions of an I/O path between the designated storage system components associated with the two checkpoint times. One or more automated actions may be performed related to the designated storage system components associated with the anomalous portions of the I/O path.

20 Claims, 11 Drawing Sheets

(56)                References Cited

U.S. PATENT DOCUMENTS

2025/0004903 A1*   1/2025   Mimouni ............ G06F 11/3447
2025/0008226 A1*   1/2025   Dziezanowski  ........ G06F 9/542

OTHER PUBLICATIONS

De Jong et al., "Memory interconnection test at board level," Proceedings International Test Conference 1992, Baltimore, MD, USA, 1992, pp. 328-337 (Year: 1992).*

Benso et al., "Automatic March tests generation for multi-port SRAMs," Third IEEE International Workshop on Electronic Design, Test and Applications (DELTA'06), Kuala Lumpur, Malaysia, 2006, pp. 6 pp. 392 (Year: 2006).*

Rayudu, "Functional testing technique for Microprocessor Interface board," 2015 International Conference on VLSI Systems, Architecture, Technology and Applications (VLSI-SATA), Bengaluru, India, 2015, pp. 1-5 (Year: 2015).*

Kiswany et al; "stdchk: A Checkpoint Storage System for Desktop Grid Computing"; The University of British Columbia; downloaded May 8, 2024.

Olson, Danny; "How can Checkpoint optimize I/O performance with SSD's?"; https://community.checkpoint.com/t5/Management/How-can-Checkpoint-optimize-I-O-performance-with-SSD-s/td-p/14932; Apr. 12, 2018.

Chandrasekar et al; "Research: Checkpoint File System"; https://computing.llnl.gov/projects/scalable-checkpoint-restart-for-mpi/checkpoint-file-system-research; LLNL-CONF-592884, International Symposium on High Performance Distributed Computing 2013, New York City, NY, Jun. 2013.

* cited by examiner

STORAGE DATA CLIENT (SDC)

PERFORMANCE EVALUATION CONTROL MODULE
310

INPUT/OUTPUT (I/O) GENERATION MODULE WITH CHECKPOINT INSERTION
320

CHECKPOINT EVALUATION MODULE
330

TEST STORAGE VOLUMES
340

300

800

| | HEADER(S) | HEADER(S) |
|---|---|---|
| I/O ID 1 | CHECKPOINT – WRITE RECEIVED IN SDS 420 | CHECKPOINT TIME |
| I/O ID 1 | CHECKPOINT – WRITE ARRIVED TO WRITE CACHE 425 | CHECKPOINT TIME |
| I/O ID 1 | CHECKPOINT – WRITE SENT TO STORAGE DEVICE TARGET 450 | CHECKPOINT TIME |
| I/O ID 1 | CHECKPOINT – WRITE ARRIVED TO STORAGE DEVICE TARGET 450 | CHECKPOINT TIME |
| I/O ID 1 | CHECKPOINT – WRITE ARRIVED TO THROTTLER 460 | CHECKPOINT TIME |
| I/O ID 1 | CHECKPOINT – WRITE ARRIVED TO DEVICE OBJECT 465 | CHECKPOINT TIME |
| I/O ID 1 | CHECKPOINT – WRITE PERFORMED ON DEVICE OBJECT 465 TO STORAGE DEVICE 470 | CHECKPOINT TIME |
| ... | ... | ... |
| I/O ID 6 | CHECKPOINT – READ RECEIVED IN SDS 420 | CHECKPOINT TIME |
| I/O ID 6 | CHECKPOINT – READ ARRIVED TO WRITE CACHE 425 | CHECKPOINT TIME |
| I/O ID 6 | CHECKPOINT – READ SENT TO STORAGE DEVICE TARGET 450 | CHECKPOINT TIME |
| I/O ID 6 | CHECKPOINT – READ ARRIVED TO STORAGE DEVICE TARGET 450 | CHECKPOINT TIME |
| I/O ID 6 | CHECKPOINT – READ ARRIVED TO DEVICE OBJECT 465 | CHECKPOINT TIME |
| I/O ID 6 | CHECKPOINT – READ PERFORMED ON DEVICE OBJECT 465 FROM STORAGE DEVICE 470 | CHECKPOINT TIME |
| ... | ZEROES | ZEROES |

FIG. 8

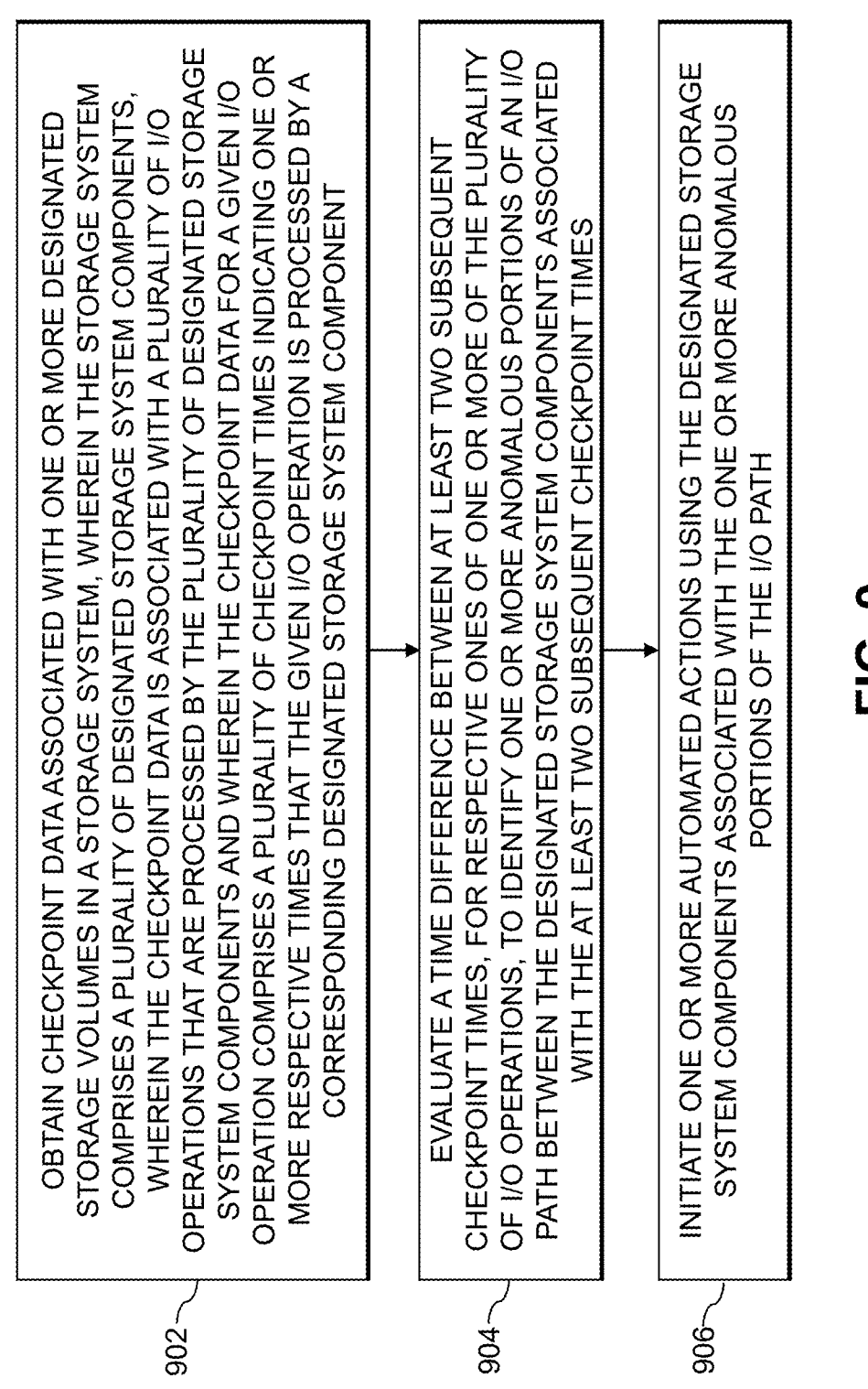

OBTAIN CHECKPOINT DATA ASSOCIATED WITH ONE OR MORE DESIGNATED STORAGE VOLUMES IN A STORAGE SYSTEM, WHEREIN THE STORAGE SYSTEM COMPRISES A PLURALITY OF DESIGNATED STORAGE SYSTEM COMPONENTS, WHEREIN THE CHECKPOINT DATA IS ASSOCIATED WITH A PLURALITY OF I/O OPERATIONS THAT ARE PROCESSED BY THE PLURALITY OF DESIGNATED STORAGE SYSTEM COMPONENTS AND WHEREIN THE CHECKPOINT DATA FOR A GIVEN I/O OPERATION COMPRISES A PLURALITY OF CHECKPOINT TIMES INDICATING ONE OR MORE RESPECTIVE TIMES THAT THE GIVEN I/O OPERATION IS PROCESSED BY A CORRESPONDING DESIGNATED STORAGE SYSTEM COMPONENT

902

EVALUATE A TIME DIFFERENCE BETWEEN AT LEAST TWO SUBSEQUENT CHECKPOINT TIMES, FOR RESPECTIVE ONES OF ONE OR MORE OF THE PLURALITY OF I/O OPERATIONS, TO IDENTIFY ONE OR MORE ANOMALOUS PORTIONS OF AN I/O PATH BETWEEN THE DESIGNATED STORAGE SYSTEM COMPONENTS ASSOCIATED WITH THE AT LEAST TWO SUBSEQUENT CHECKPOINT TIMES

904

INITIATE ONE OR MORE AUTOMATED ACTIONS USING THE DESIGNATED STORAGE SYSTEM COMPONENTS ASSOCIATED WITH THE ONE OR MORE ANOMALOUS PORTIONS OF THE I/O PATH

IDENTIFYING ANOMALOUS PORTIONS OF INPUT/OUTPUT PATHS BY MONITORING CHECKPOINTS OF INPUT/OUTPUT OPERATIONS THROUGH A STORAGE SYSTEM

BACKGROUND

Distributed storage systems may include distributed storage nodes that are interconnected by a network. Each storage node of a distributed storage system typically processes input/output (I/O) operations from one or more host devices. It is often difficult to identify performance issues encountered during the processing of such I/O operations.

SUMMARY

Illustrative embodiments of the disclosure provide techniques for identifying anomalous portions of I/O paths by monitoring checkpoints of I/O operations through a storage system (e.g., by monitoring respective times that each I/O operation is processed by different designated components of a storage system). An exemplary method comprises obtaining checkpoint data associated with one or more designated storage volumes in a storage system, wherein the storage system comprises a plurality of designated storage system components, wherein the checkpoint data is associated with a plurality of I/O operations that are processed by the plurality of designated storage system components and wherein the checkpoint data for a given I/O operation comprises a plurality of checkpoint times indicating one or more respective times that the given I/O operation is processed by a corresponding designated storage system component; evaluating a time difference between at least two checkpoint times, for respective ones of at least some of the plurality of I/O operations, to identify one or more anomalous portions of an I/O path between the designated storage system components associated with the at least two checkpoint times; and initiating one or more automated actions related to the designated storage system components associated with the one or more anomalous portions of the I/O path.

Illustrative embodiments can provide significant advantages relative to conventional techniques. For example, problems associated with identifying one or more root causes of performance issues in a storage system are overcome in one or more embodiments by monitoring checkpoint times as I/O operations are processed by designated components of the storage system and identifying anomalous portions of an I/O path by evaluating the monitored checkpoint times.

Other illustrative embodiments include, without limitation, apparatus, systems, methods and computer program products comprising processor-readable storage media.

BRIEF DESCRIPTION OF THE DRAWINGS

FIG. 8 is a sample table illustrating user data, associated with one or more designated storage volumes in a storage system, appended with checkpoint data for multiple I/O operations in accordance with an illustrative embodiment;

FIG. 9 is a flow diagram illustrating an exemplary implementation of a method for identifying anomalous portions of I/O paths by monitoring checkpoints of I/O operations through a storage system in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for identifying anomalous portions of I/O paths by monitoring checkpoints of I/O operations through a storage system.

Figure 1:
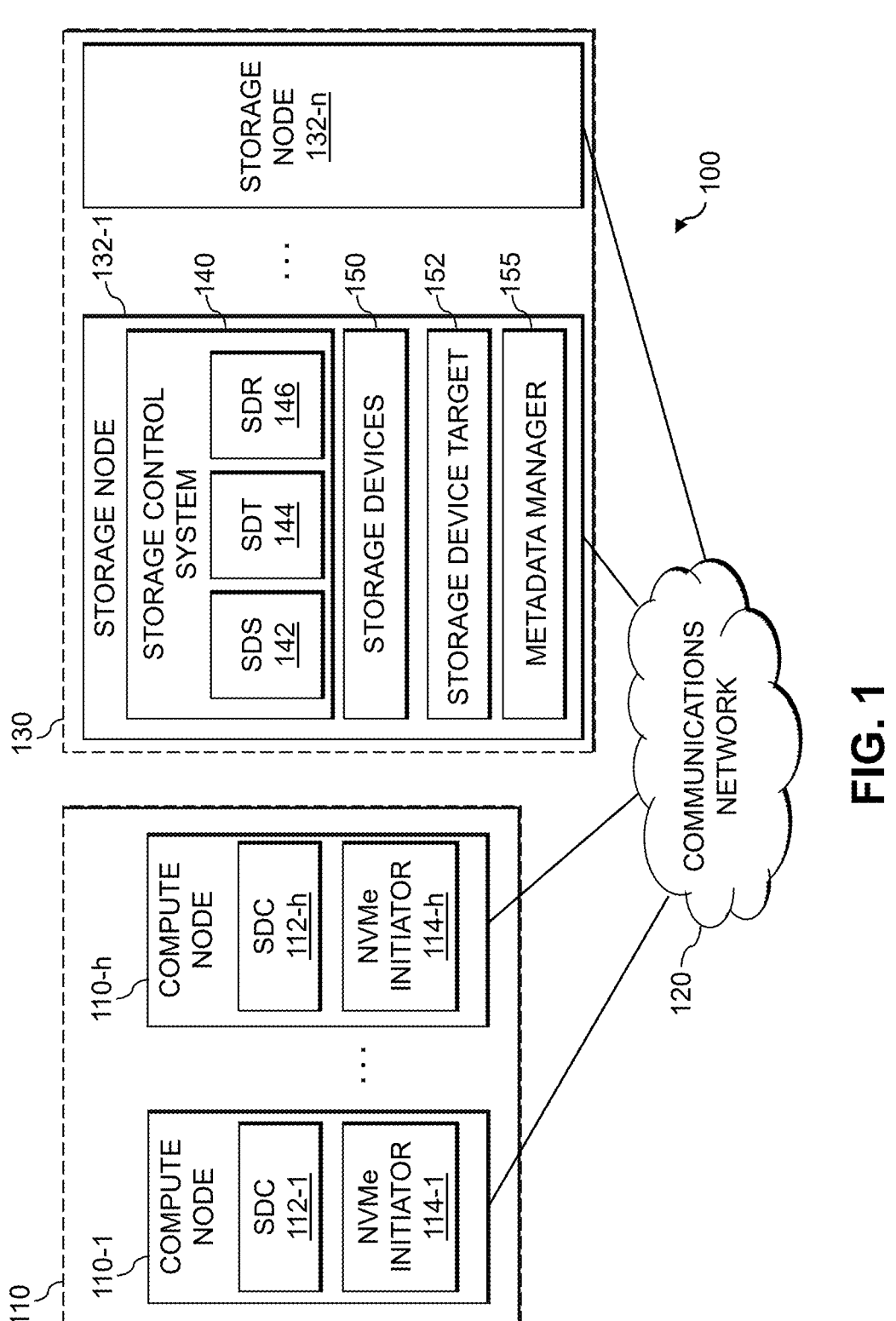
FIG. 1 illustrates a network computing environment that can be configured for identifying anomalous portions of I/O paths by monitoring checkpoints of I/O operations through a storage system in accordance with an illustrative embodiment.

FIG. 1 schematically illustrates a computing environment 100 that can be configured for identifying anomalous portions of I/O paths by monitoring checkpoints of I/O operations through a storage system, according to an exemplary embodiment of the disclosure. In particular, FIG. 1 schematically illustrates one or more compute nodes 110-1 . . . 110-h (collectively, compute nodes 110), a communications network 120 and a data storage system 130 comprising a plurality of storage nodes 132-1 . . . 132-n (collectively, storage nodes 132).

In some embodiments, each compute node 110-1 . . . 110-h respectively comprises a storage data client (SDC) 112-1 . . . 112-h and a non-volatile memory express (NVMe) initiator 114-1 . . . 114-h (or NVMe initiator 114), the functions of which will be explained below.

As further shown in FIG. 1, the storage node 132-1 comprises a storage control system 140, storage devices 150, a storage device target 152 and a metadata manager (MDM) 155. In some embodiments, the storage control system 140 is a software-defined storage control system that comprises a storage data server (SDS) 142, a storage data target (SDT) 144 and a storage data replicator (SDR) 146, the functions of which will be explained below. In some embodiments, the other storage nodes (e.g., storage node 132-*n*) have the same or similar configuration as the storage node 132-1 shown in FIG. 1.

The compute nodes 110 may comprise physical server nodes and/or virtual server nodes that host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the compute nodes 110 comprise application servers, database servers, etc. The compute nodes 110 can include virtual nodes such as virtual machines and container systems. In some embodiments, the compute nodes 110 comprise a cluster of computing nodes of an enterprise computing system, a cloud-based computing system, or other types of computing systems or information processing systems comprising multiple computing nodes associated with respective users. The compute nodes 110 issue data access requests to the data storage system 130, wherein the data access requests include (i) write requests to store data in one or more of the storage nodes 132 and (ii) read requests to access data that is stored in one or more of the storage nodes 132.

The communications network 120 is configured to enable communication between the compute nodes 110 and the storage nodes 132, as well as peer-to-peer communications between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, that enable communication using, e.g., Transfer Control Protocol/Internet Protocol (TCP/IP) or other communication protocols such as Fibre Channel (FC), FC over Ethernet (FCoE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors that execute a lightweight operating system (e.g., a customized lightweight Linux kernel) and functional software (e.g., software-defined storage software) to implement functions of the storage control system 140, as discussed in further detail below.

The storage devices 150 of a given storage node 132 can be internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of persistent storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The data storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out storage system that allows additional storage nodes to be added (or removed) to the cluster to scale the performance and storage capacity of the data storage system 130. It is to be noted that each storage node 132 and associated storage devices 150 is an example of what is more generally referred to herein as a "storage system" or a "storage array."

In some embodiments, the data storage system 130 comprises a dynamic scale-out software-defined storage system that is configured to implement a high-capacity block-level SAN storage system (e.g., virtual SAN system) that consolidates the capacity of the storage devices 150 (e.g., HDDs, SSDs, NVMe flash storage, flash PCIe cards etc.) of the storage nodes 132 into shared block storage that is logically partitioned into logical storage volumes identified by, e.g., logical unit numbers (LUNs). In an exemplary embodiment of a scale-out software-defined SAN storage system, the storage control systems 140 comprise software components of a software-defined storage system, that are executed on the storage nodes 132 to implement a software-defined storage environment in which the storage nodes 132 form a loosely coupled storage server cluster and collectively communicate and operate to create a server-based SAN system (e.g., virtual SAN) to provide host access to a virtual pool of block storage using the combined storage capacity (e.g., storage devices 150) of the storage nodes 132.

In some embodiments, the SDCs 112, the MDMs 155, the SDSs 142, the SDTs 144, and the SDRs 146, for example, of the storage nodes 132 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture that can grow from a few servers to thousands of severs.

For example, the SDS 142 comprises a service that is configured to manage the storage capacity (e.g., storage devices 150) of a single server (e.g., storage node 132) and provide backend access to the storage devices of the server. In other words, the SDS 142 is installed on each server that contributes some or all of the capacity of its local storage devices to the scale-out data storage system. More specifically, in the scale-out software-defined storage environment, the SDSs 142 of the storage control systems 140 are configured to create and manage storage pools (e.g., virtual pools of block storage) by aggregating storage capacity of the respective storage devices 150 and dividing each storage pool into one or more volumes, wherein the volumes are exposed to the SDCs 112 of the compute nodes 110 as virtual block devices. For example, a virtual block device can correspond to a volume of a storage pool. Each virtual block device comprises any number of actual physical storage devices, wherein each virtual block device is preferably homogenous in terms of the type of storage devices that make up the block device (e.g., a block device can include only HDD devices or SSD devices, etc.). In this regard, each instance of the SDS 142 that runs on a respective one of the storage nodes 132 contributes some or all of its local storage space to an aggregated virtual pool of block storage with varying performance tiers (e.g., HDD, SSD, etc.) within a virtual SAN.

In some embodiments, each SDC 112 that executes on a given compute node 110 comprises a lightweight block device driver that is deployed to expose shared block volumes to the compute nodes 110. An SDC 112 may expose one or more designated test volumes, discussed further below. In particular, each SDC 112 is configured to expose the storage volumes as block devices to the applications located on the same server (e.g., application server) on which the SDC 112 is installed. In other words, as shown in FIG. 1, the SDCs 112 run on the same server machines as the compute nodes 110 that require access to the block devices exposed and managed by the SDSs 142 of the storage nodes 132. The SDC 112 of a given compute node 110 exposes block devices representing the virtual storage volumes that are currently mapped to the given compute node 110. In particular, the SDC 112 for a given compute node 110 serves as a block driver for the compute node 110, wherein the SDC 112 intercepts I/O requests, and utilizes the intercepted I/O request to access the block storage that is managed by the SDSs 142. The SDCs 112 are installed in the operating system or hypervisor hosting the application layer and provide the operating system or hypervisor (that runs the SDC 112) access to the logical block devices (e.g., volumes). The SDCs 112 have knowledge of which SDSs 142 hold its block data, so multipathing can be accomplished natively through the SDCs 112, where the communications network 120 is configured to provide an any-to-any connection between the compute nodes 110 and the storage nodes 132. More specifically, each SDC 112 connects to every SDS 142, which eliminates the need for multipath software, in at least some embodiments.

In some embodiments, the MDMs 155 implement a management layer on one or more of the storage nodes 132 that manages and configures the software-defined storage system in the computing environment 100. The MDMs 155 are services that function as a monitoring and configuration agent of the storage environment. More specifically, in some embodiments, the management layer is configured to supervise the operations of the storage cluster and manage storage cluster configurations. For example, the MDMs 155 (or an MDM cluster) manage the storage system by aggregating the entire storage exposed to the MDM cluster by the SDSs 142 to generate a virtual storage layer (e.g., virtual SAN storage layer), wherein logical volumes can be defined over storage pools and exposed to host applications as a local storage device using the SDCs 112.

Further, the MDMs 155 are configured to manage various types of metadata associated with the software-defined storage system. For example, such metadata includes a mapping of the SDCs 112 to the SDSs 142 of the storage nodes 132, wherein such mapping information is provided to the SDCs 112 and the SDSs 142 to allow such components to control I/O data path operations (e.g., allow the SDCs 112 to communicate with target SDSs 142 to access data in logical volumes that are mapped to the SDCs 112). In addition, the MDMs 155 collect connectivity status updates from the SDCs 112 to monitor all connections between SDCs 112 and the SDSs 142 to determine the current system state, and post events whenever a given SDC 112 connects to or disconnects from a specific IP address of a given SDS 142.

In addition, the MDMs 155 may be configured to manage various management operations such as data migration, rebuilds, and other system-related functions. In this regard, the MDMs 155 generate and manage various types of metadata that are required to perform various management operations in the storage environment such as, e.g., performing data migration operations, performing rebalancing operations, managing configuration changes, managing the SDCs 112 and the SDSs 142, maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. The MDMs 155 communicate with the SDCs 112 to provide notification of changes in data layout, and communicate with the SDSs 142 to coordinate rebalancing operations. In some embodiments, the MDMs 155 are configured to implement a distributed cluster management system.

In some embodiments, the software-defined storage system utilizes various logical entities that link the physical layer to the virtual storage layer, wherein such logical entities include protection domains, fault sets, and storage pools. In some embodiments, a protection domain is a logical entity that comprises a group of SDSs 142 that provide backup for each other. Each SDS 142 belongs to only one protection domain such that each protection domain comprises a unique set of SDSs 142. In some embodiments, each protection domain can have up to a maximum number of SDS nodes (e.g., 128 SDS nodes). The use of protection domains enables optimal performance, reduction of mean time between failure (MTF) issues, and the ability to sustain multiple failures in different protection domains.

Further, in some embodiments, a fault set is a logical entity that defines a logical group of SDS nodes (within a protection domain) that are more inclined to fail together, e.g., a group of SDS nodes within a given protection domain that are all powered in a same rack. By grouping SDS nodes into a given fault set, the system is configured to mirror the data for all storage devices in the given fault set, wherein mirroring is performed on SDS nodes that are outside the given fault set. A fault unit can be either a fault set or an SDS node that is not associated with a fault set. In some embodiments, user data is maintained in a RAID-1 mesh mirrored layout, where each piece of data is stored on two different fault units. The copies are distributed over the storage devices according to an algorithm that ensures uniform load of each fault unit in terms of capacity and expected network load.

Moreover, in some embodiments, a storage pool is a logical entity that defines a set of physical storage devices in a protection domain, wherein each storage device belongs to only one storage pool. When a volume is configured over the virtualization storage layer, in some embodiments, the volume is distributed over all devices residing in the same storage pool. Each storage pool comprises a homogeneous set of storage devices (e.g., HDD storage pool, or SSD storage pool) to enable storage tiering. In some embodiments, each volume block has two copies located on two different fault units (e.g., two different SDS nodes), that allows the system to maintain data availability following a single-point failure.

The SDR 146 is a software component that is configured to implement a data replication system, e.g., journal-based asynchronous replication. In some embodiments, asynchronous replication is performed between two peer data storage systems, which are connected via a WAN. In general, in some embodiments, asynchronous replication involves writing data to a source (primary) volume in a first data storage system and acknowledging completion of an I/O write operation to a host application before the data is replicated to a target (replica) volume in a second (remote) data storage system (e.g., the source (primary) volume and the target (replica) volume do not share hardware elements in at least some embodiments). With asynchronous replication, the I/O write operations at a source storage node are logged in a replication journal by a source SDR 146 on the source storage node, and the replication journal is periodically transmitted at scheduled times to a target storage node, wherein a target SDR 146 on the target storage node processes the received replication journal to replicate data to a target (replica) volume. The data replication system can be utilized for various purposes including, but not limited to, recovering from a physical or logical disaster, migrating data, testing data at a remote site, or offloading a data backup operation.

More specifically, in the exemplary embodiment of FIG. 1, the SDR 146 is responsible for processing all I/O requests associated with replicated volumes. In the source system, for replicated volumes, the SDCs 112 communicate with the SDR 146. For non-replicated volumes, the SDCs 112 communicate directly with the SDSs 142. At a source storage node, application I/O requests associated with a replicated volume are sent in some embodiments by an SDC 112 to a source SDR 146. The source SDR 146 will write the required journal data to a replication journal volume, and then send a duplicate of the replication I/O write request and associated user data to the SDS 142 wherein the SDS 142 performs write operations to write the received I/O user data in a primary volume. The journal data is then transmitted to a target SDR 146 on a target storage node, which processes the received replication journal to replicate data to the target (replica) volume. In some embodiments, a minimum of two SDRs are deployed on the source and target storage nodes to maintain high availability. If one SDR fails, the management layer (e.g., one or more MDM nodes) directs the SDCs to send the I/O requests for replicated volumes to an available SDR 146.

The SDT 144 can be a front-end target that is a software component configured to provide support for, for example, NVMe-oF, in particular, NVMe over TCP (NVMe/TCP) that enables NVMe-oF across a standard Ethernet network. In some embodiments, the SDT 144 is configured in the storage layer to handle the I/O requests of the NVMe initiators 114 to provide support for the NVMe/TCP storage protocol for front end connectivity, and thus, allow the use of NVMe/TCP hosts in addition to the SDCs 112. In some embodiments, the SDT 144 is an NVMe target that is configured to translate control and I/O data path packets to the NVMe standard protocol, wherein each NVMe initiator 114 is serviced by multiple SDTs 144 depending on the supported number of paths in the NVMe multipathing driver. In essence, I/O requests are sent from a host NVMe initiator 114 (which is installed in the host operating system or hypervisor) to the SDT 144, and the SDT 144 communicates with a target SDS 142 to direct the I/O request to the target SDS 142.

The storage device target 152 of a given storage node 132 can be a backend target configured to manage storage devices 150 and to coordinate a processing of I/O operations on one or more of the storage devices 150, as discussed further below in conjunction with FIG. 4.

A distributed storage system may employ user data storage volumes for storing user data, and metadata storage volumes for storing the metadata corresponding to the user data. The metadata associated with a given SDS may be managed by one or more metadata units. The ownership of the user data storage capacity may be spread among multiple metadata units. The number of metadata units on a given SDS may vary. The different metadata units on an SDS may each have a different number of metadata pages at a given time. In order to provide a scalable system, one or more aspects of the disclosure recognize that the metadata storage volumes should start at a designated size and be expandable to support additional metadata pages.

Figure 2:
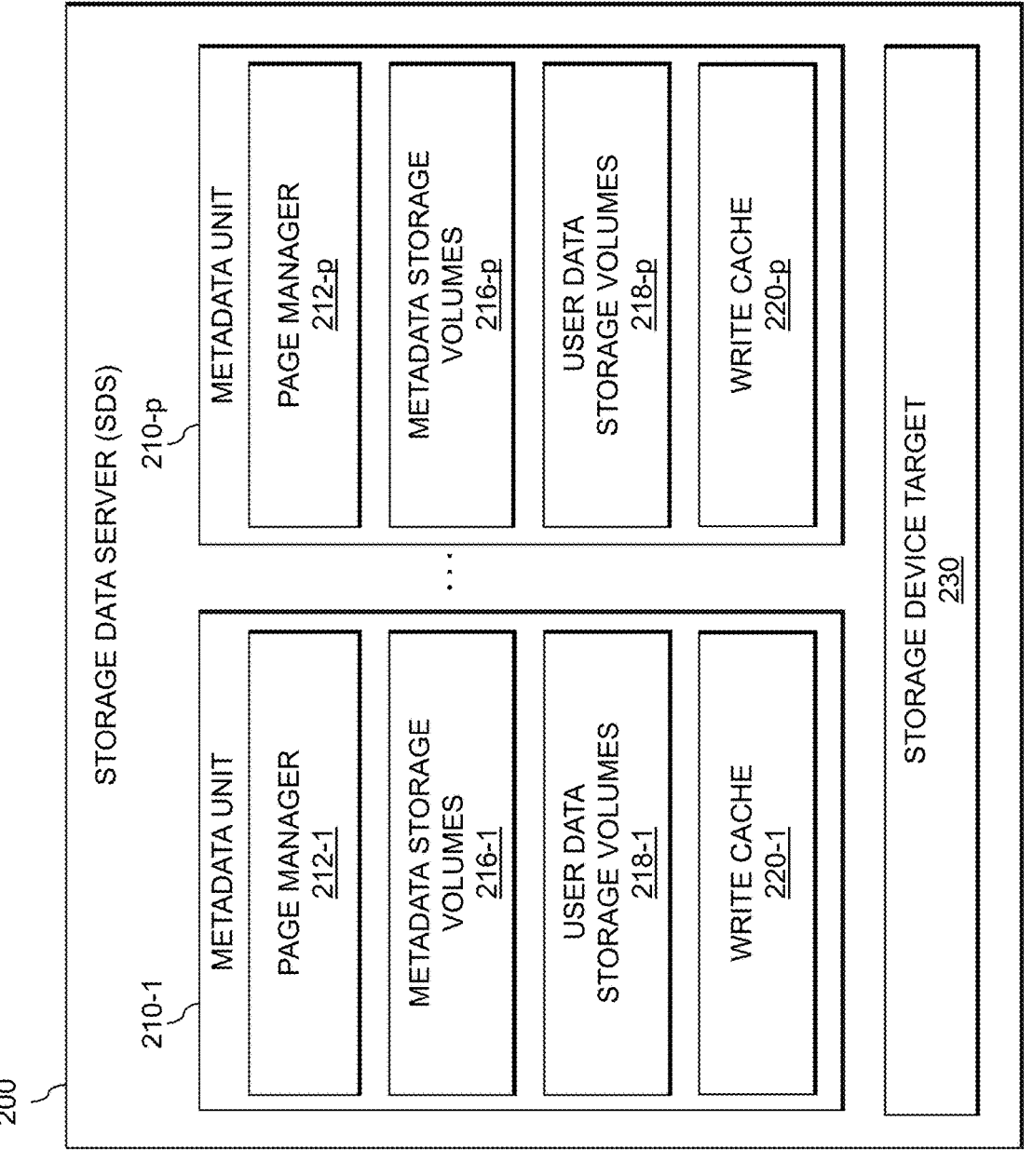
FIG. 2 illustrates a storage data server of FIG. 1 in further detail in accordance with an illustrative embodiment.

FIG. 2 illustrates an SDS of FIG. 1 in further detail in accordance with an illustrative embodiment. In the example of FIG. 2, an SDS 200 comprises one or more metadata units 210-1 . . . 210-p (collectively, metadata units 210) and a storage device target 230. In some embodiments, metadata unit 210-1 comprises a respective page manager 212-1, one or more metadata storage volumes 216-1, one or more user data storage volumes 218-1 and a write cache 220-1. Similarly, metadata unit 210-p comprises a respective page manager 212-p, one or more metadata storage volumes 216-p, one or more user data storage volumes 218-p and a write cache 220-p. The metadata storage volumes 216 and the user data storage volumes 218 are configured to store metadata pages and user data pages, respectively, and may also store additional information, such as checkpoints and write journals. The write cache 220 may be used to improve performance by using a volatile memory (e.g., RAM) to gather write commands sent to a storage device 150.

As noted above, a storage device target 230 of a given SDS 200 can be a backend target configured to manage storage devices and to coordinate a processing of I/O operations on such storage devices.

The page manager 212 splits the metadata storage volumes 216 into metadata pages (not shown in FIG. 2), and processes requests to allocate and deallocate metadata pages on a metadata storage volume. In some fault scenarios, the page manager 212 may rebuild the metadata stored in one or more of the metadata storage volumes 216. Generally, a metadata page characterizes a plurality of user data pages stored on user data storage volumes 218. For example, in a given set of user data pages, each of the user data pages may be characterized by a storage volume identifier, an offset and possibly a signature.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages and/or the user data pages.

The user data pages are part of the user data storage volumes 218 (e.g., LUNs) configured to store files, blocks, objects or other arrangements of data, each also generally referred to herein as a "data item," on behalf of users. The user data stored in the user data pages can include any type of user data that may be utilized in the computing environment 100. The terms "metadata page" and "user data" herein are therefore also intended to be broadly construed.

Figure 3:
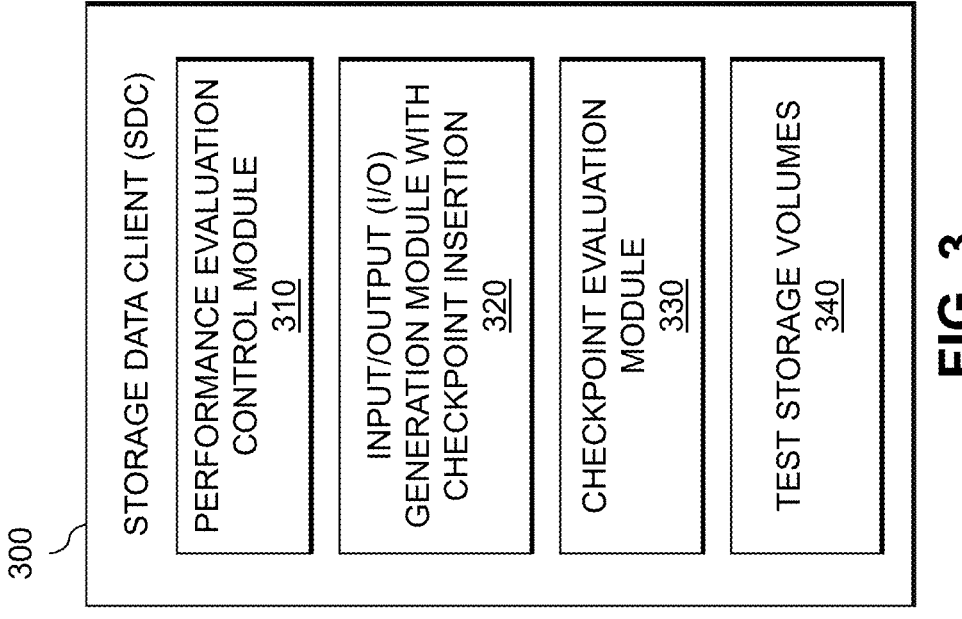
FIG. 3 illustrates a storage data client of FIG. 1 in further detail in accordance with an illustrative embodiment.

FIG. 3 illustrates an SDC of FIG. 1 in further detail in accordance with an illustrative embodiment. In the example of FIG. 3, an SDC 300 comprises a performance evaluation control module 310, an I/O generation module with checkpoint insertion 320, a checkpoint evaluation module 330 and one or more test storage volumes 340.

In one or more embodiments, the performance evaluation control module 310 controls an activation of a storage system performance evaluation mode, as discussed further below in conjunction with FIG. 5. The I/O generation module with checkpoint insertion 320 generates I/O operations of a designated size (e.g., 8 KBs) in the storage system performance evaluation mode to one or more test storage volumes 340, as discussed further below in conjunction with FIG. 5.

The checkpoint evaluation module 330 evaluates the checkpoint data collected during the storage system performance evaluation mode to identify anomalous portions of an I/O path, as discussed further below in conjunction with FIG. 7. As noted above, the I/O operations generated in the storage system performance evaluation mode are written to one or more of the test storage volumes 340 (which are mapped to one or more storage devices).

It is to be appreciated that this particular arrangement of elements 310, 320, 330, 340 illustrated in the SDC 300 of the FIG. 3 embodiment is presented by way of example only, and alternative arrangements can be used in other embodiments. For example, the functionality associated with elements 310, 320, 330, 340 in other embodiments can be combined into a single element, or separated across a larger number of elements. As another example, multiple distinct processors and/or memory elements can be used to implement different ones of elements 310, 320, 330, 340 or portions thereof. At least portions of elements 310, 320, 330, 340 may be implemented at least in part in the form of software that is stored in memory and executed by a processor. In addition, while the example of FIG. 3 illustrates elements 310, 320, 330, 340 as being part of an SDC 300, one or more of the elements 310, 320, 330, 340 may be part of a different element (or of multiple elements) of the computing environment 100 of FIG. 1.

Figure 4:
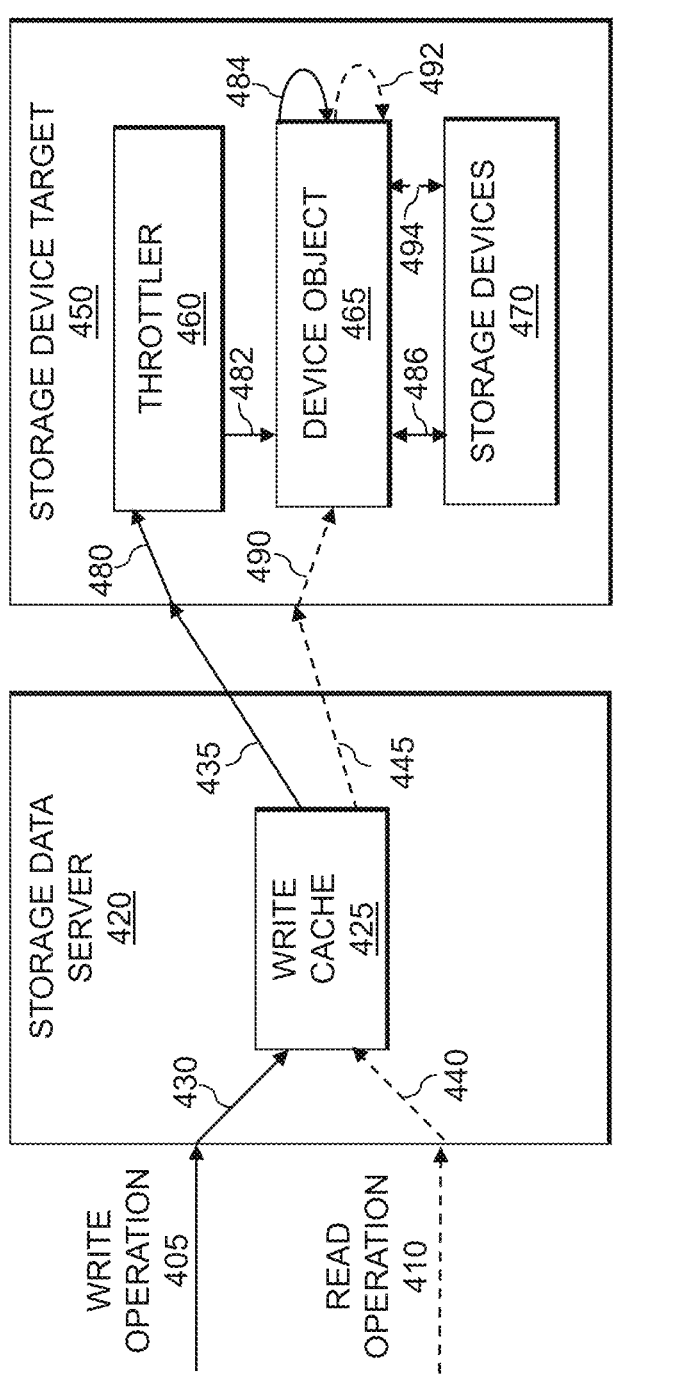
FIG. 4 illustrates a checkpointing of I/O operations through a storage system in accordance with an illustrative embodiment.

FIG. 4 illustrates a checkpointing of I/O operations through a storage system in accordance with an illustrative embodiment. In some embodiments, components along an I/O path in a storage system may be designated as checkpoint locations, as discussed herein. In the example of FIG. 4, a processing of a write operation 405 is shown using a solid line, while a processing of a read operation 410 is shown using a dashed line. The write operation 405 is received by a storage data server 420, which may have an associated checkpoint. The received write operation 405 is provided to a write cache 425, which may have an associated checkpoint in some embodiments, using a signal 430. The write cache 425 provides the write operation 405 to a storage device target 450 (e.g., using a network, such as communications network 120), which may have an associated checkpoint in some embodiments, using a signal 435. The storage device target 450 provides the write operation 405 to a throttler 460, which may have an associated checkpoint in some embodiments, using a signal 480.

The throttler 460 provides the write operation 405 to a device object 465, that processes read and write operations and which may have an associated checkpoint in some embodiments, using a signal 482. The device object 465 processes the write operation 405, as indicated by operation 484, which includes writing the user data associated with the write operation 405 to one or more storage devices 470, using a signal 486.

In the example of FIG. 4, the read operation 410 is received by the storage data server 420, which may have an associated checkpoint. The received read operation 410 is provided to the write cache 425, which may have an associated checkpoint in some embodiments, using a signal 440. The write cache 425 provides the read operation 410 to the storage device target 450 (e.g., using a network, such as communications network 120), which may have an associated checkpoint in some embodiments, using a signal 445. The storage device target 450 provides the read operation 410 to the device object 465, which may have an associated checkpoint in some embodiments, using a signal 490. The device object 465 processes the read operation 410, as indicated by operation 492, which includes reading the user data associated with the read operation 410 from one or more storage devices 470, using a signal 494.

In this manner, as each designated checkpoint is traversed in the I/O path through the storage data server 420 and/or the storage device target 450, the corresponding component 420, 425, 450, 460, 465 and/or 470 appends a checkpoint time in the user data associated with the I/O operation, as discussed further below in conjunction with FIG. 8.

Figure 5:
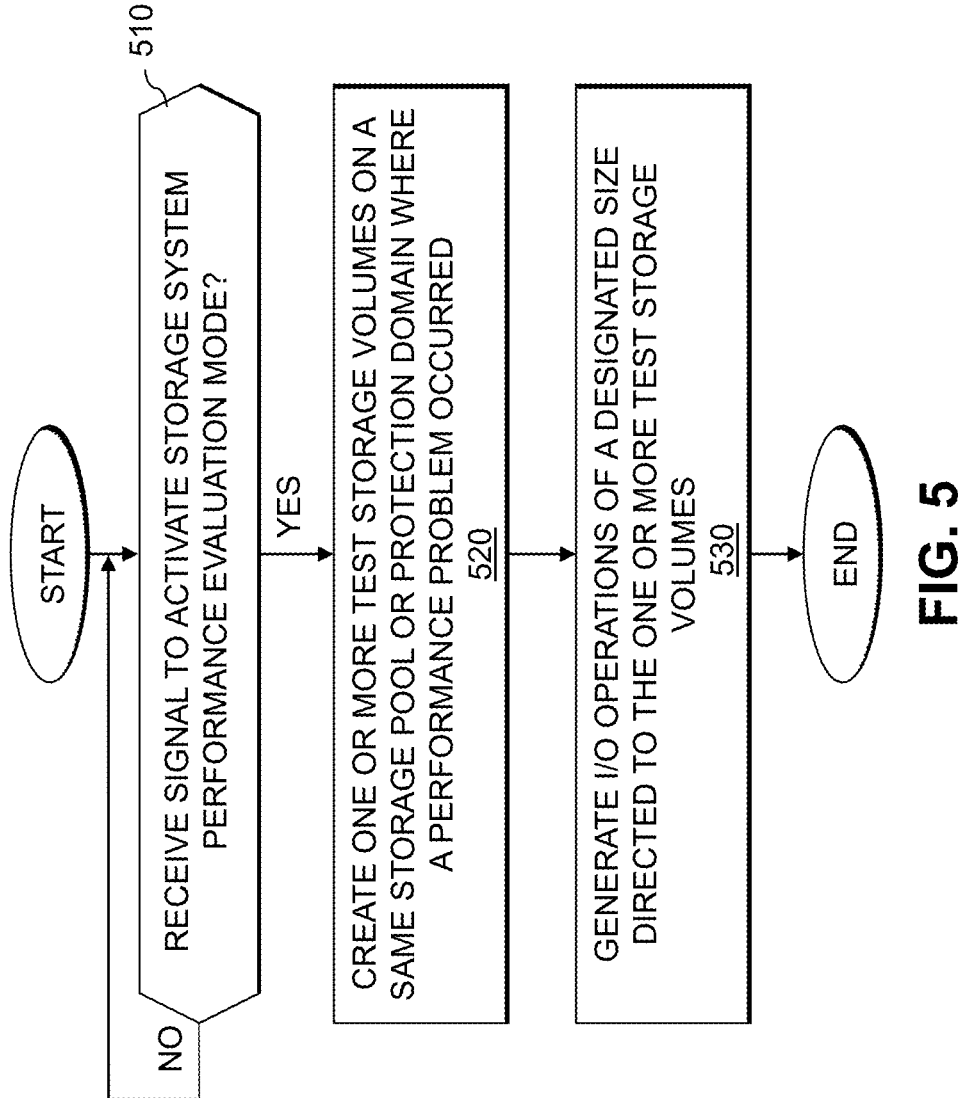
FIG. 5 is a flow diagram illustrating an exemplary implementation of a method for activating a storage system performance evaluation mode in accordance with an illustrative embodiment.

FIG. 5 is a flow diagram illustrating an exemplary implementation of a method for activating a storage system performance evaluation mode in accordance with an illustrative embodiment. Portions of the method of FIG. 5 may be performed, in some embodiments, by the performance evaluation control module 310 and the I/O generation module with checkpoint insertion 320 of FIG. 3.

In the example of FIG. 5, a test is performed in step 510 to determine if a signal is received to activate the storage system performance evaluation mode. The storage system performance evaluation mode may be activated, for example, in response to a customer or a user reporting a performance issue. If it is determined in step 510 that the storage system performance evaluation mode has not been activated, then program control returns to step 510 to continue monitoring for the activation of the storage system performance evaluation mode.

If, however, it is determined in step 510 that the storage system performance evaluation mode has not been activated, then one or more test storage volumes are created in step 520, for example, on a same storage pool or protection domain where a performance problem occurred. In addition, I/O operations of a designated size are generated in step 530 directed to the one or more test storage volumes 340. For example, the designated size may be a similar size as I/O operations that were reported to encounter a performance problem. In some embodiments, a flag may be added to a header of the user data associated with the I/O operations generated in step 530 to provide an indication that such I/O operations are special I/O operations for performance validation (and to ignore, for example, integrity checks, such as an evaluation of a checksum).

In some embodiments, read and write operations directed to the test storage volumes created in step 520 are tracked using the disclosed checkpointing techniques. As each I/O operation passes a designated checkpoint, as discussed above in conjunction with FIG. 4, the checkpoint time and additional information (e.g., a checkpoint identifier and/or an I/O operation identifier) may be appended in the checkpoint data. While the storage system performance evaluation mode is activated, data compression may be disabled and integrity checks may be suppressed.

Figure 6:
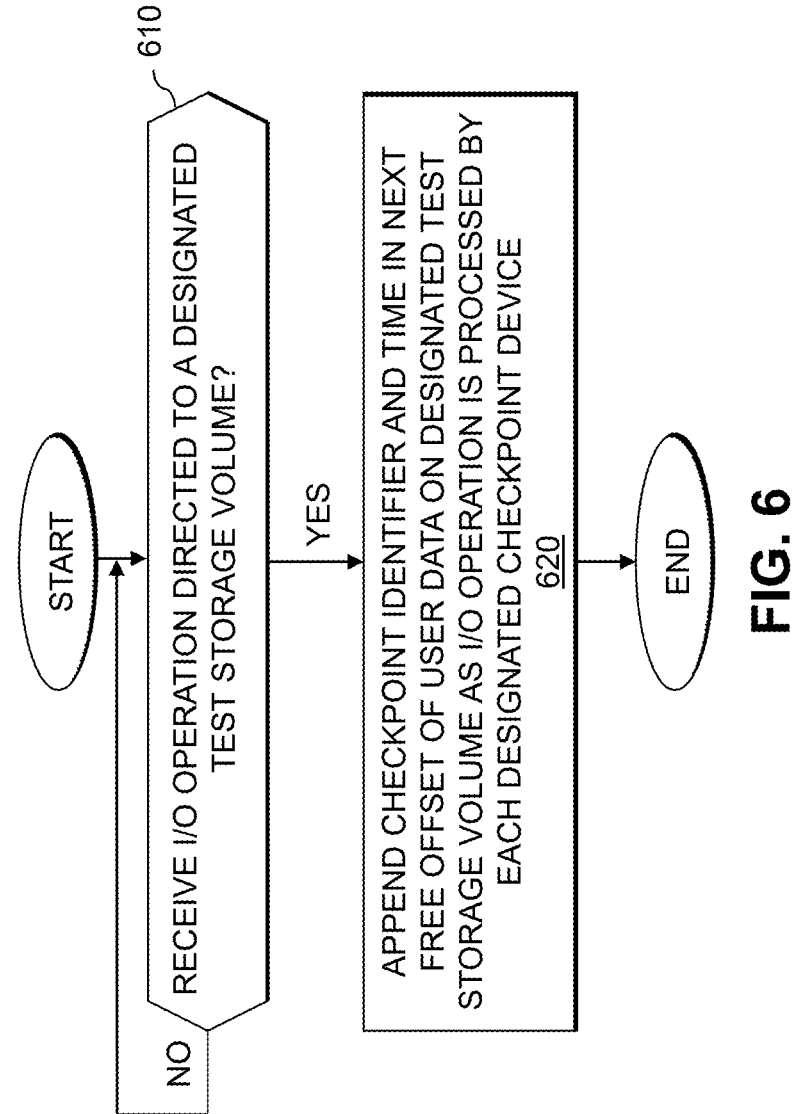
FIG. 6 is a flow diagram illustrating an exemplary implementation of a method for processing I/O operations in a storage system during a storage system performance evaluation mode in accordance with an illustrative embodiment.

FIG. 6 is a flow diagram illustrating an exemplary implementation of a method for processing I/O operations in a storage system during a storage system performance evaluation mode in accordance with an illustrative embodiment. The method of FIG. 6 may be performed, in some embodiments, by one or more designated storage system components along an I/O path of FIG. 4.

In the example of FIG. 6, a test is performed in step 610 to determine if a received I/O operation is directed to a designated test storage volume. If it is determined in step 610 that the received I/O operation is not directed to a designated test storage volume, then program control returns to step 610 to continue monitoring for an I/O operation directed to a designated test storage volume. It is noted that a received I/O operation may be a read operation or a write operation to a particular offset location of a given storage device.

If it is determined in step 610 that received I/O operation is directed to a designated test storage volume, then the designated storage system component performing the method of FIG. 6 appends a checkpoint identifier and time in a next free offset of the user data associated with the I/O operation in step 620 on the designated test storage volume associated with the I/O operation as the I/O operation is processed by each designated checkpoint device.

Figure 7:
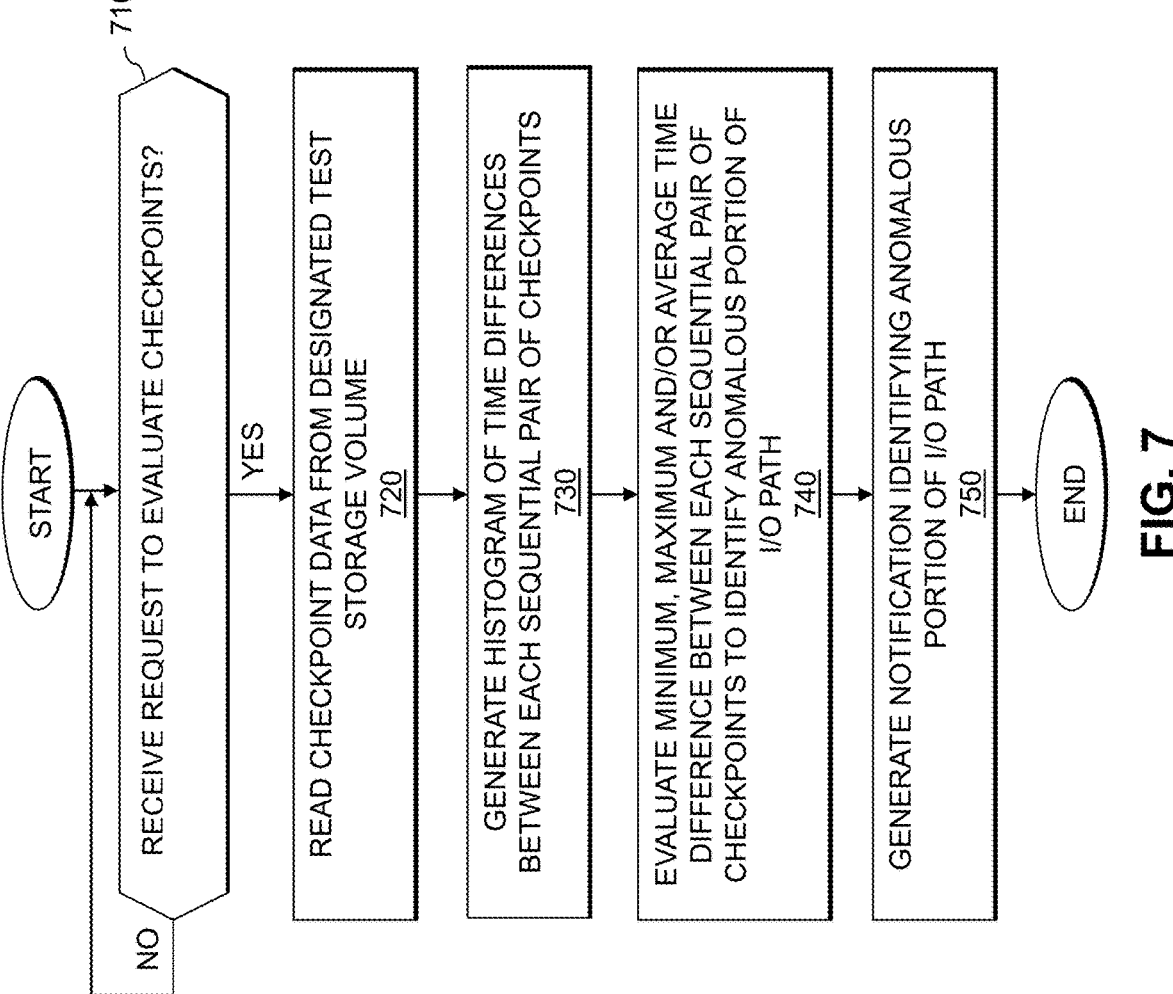
FIG. 7 is a flow diagram illustrating an exemplary implementation of a method for identifying anomalous portions of I/O paths by monitoring checkpoints of I/O operations through a storage system in accordance with an illustrative embodiment.

FIG. 7 is a flow diagram illustrating an exemplary implementation of a method for identifying anomalous portions of I/O paths by monitoring checkpoints of I/O operations through a storage system in accordance with an illustrative embodiment. The method of FIG. 7 may be performed, in some embodiments, by the checkpoint evaluation module 330 of FIG. 3.

In the example of FIG. 7, a test is performed in step 710 to determine if a request is received to evaluate one or more checkpoints. If it is determined in step 710 that a request is not received to evaluate one or more checkpoints, then program control returns to step 710 to continue monitoring for a request to evaluate one or more checkpoints.

If it is determined in step 710 that a request is received to evaluate one or more checkpoints, then the method reads checkpoint data from one or more designated test storage volumes in step 720 and generates a histogram in step 730 of the time differences between each sequential pair of checkpoints in the obtained checkpoint data.

A minimum, maximum and/or average time difference between each sequential pair of checkpoints is evaluated in step 740 to identify an anomalous portion of an I/O path (e.g., a performance bottleneck). For example, the differential checkpoint times can be compared to expected times to identify an anomaly. The detected anomalies may be the result of, for example, slow SSDs, an improper RAM configuration, an improper network configuration and/or an insufficient number of processing threads. One or more notifications may be generated in step 750 identifying the anomalous portion of the I/O path.

FIG. 8 is a sample table 800 illustrating user data, associated with one or more designated storage volumes in a storage system (e.g., designated as part of an activation of a storage system performance evaluation mode), appended with checkpoint data for multiple I/O operations in accordance with an illustrative embodiment. The checkpoint data in the table 800 is appended sequentially in the user data following one or more header portions of the user data (in a portion of the user data sometimes referred to as zeroed data).

In the example of FIG. 8, two representative I/O operations are shown having identifiers of I/O ID 1 and I/O ID 6. Multiple checkpoints are shown for each I/O operation as it traverses the storage system, as discussed above in conjunction with FIG. 4. The checkpoint data associated with the write operation having an identifier of I/O ID 1 comprises a checkpoint time for each of the following checkpoints: the write operation received in SDS 420; the write operation arrived to the write cache 425; the write operation sent to the storage device target 450; the write operation arrived to the storage device target 450; the write operation arrived to the throttler 460; the write operation arrived to the device object 465; and the write operation being processed on the device object 465 to write the user data to the storage device 470.

The I/O operation associated with the identifier of I/O ID 6 comprises a read operation and records similar checkpoint data through the storage system as the write operation having an identifier of I/O ID 1, except that the read operation does not get processed by the throttler 460. Thus, the checkpoint data for the read operation having the identifier of I/O ID 6 does not include checkpoint times associated with the throttler 460. As shown in FIG. 8, following the appended checkpoint data, the table 800 concludes with zeroed data.

FIG. 9 is a flow diagram illustrating an exemplary implementation of a method for identifying anomalous portions of I/O paths by monitoring checkpoints of I/O operations through a storage system in accordance with an illustrative embodiment. In the example of FIG. 9, checkpoint data associated with one or more designated storage volumes in a storage system, wherein the storage system comprises a plurality of designated storage system components is obtained in step 902, where the storage system comprises a plurality of designated storage system components, wherein the checkpoint data is associated with a plurality of I/O operations that are processed by the plurality of designated storage system components and wherein the checkpoint data for a given I/O operation comprises a plurality of checkpoint times indicating one or more respective times that the given I/O operation is processed by a corresponding designated storage system component.

In step 904, a time difference between at least two checkpoint times, for respective ones of one or more of the plurality of I/O operations, is evaluated to identify one or more anomalous portions of an I/O path between the designated storage system components associated with the at least two checkpoint times. One or more automated actions are initiated in step 906 related to the designated storage system components associated with the one or more anomalous portions of the I/O path.

In one or more embodiments, the checkpoint data associated with the one or more designated storage volumes is obtained in an evaluation mode that generates the plurality of I/O operations to at least one of the one or more designated storage volumes and monitors the processing of the plurality of I/O operations by the plurality of designated storage system components. The monitoring of the processing of a given one of the plurality of I/O operations by a given one of the plurality of designated storage system components may comprise the given designated storage system component appending a corresponding checkpoint time in response to the given I/O operation being processed by the given designated storage system component. The given I/O operation may have associated user data and the given designated storage system component may append the corresponding checkpoint time in the user data.

In some embodiments, the monitoring of the processing of the plurality of I/O operations by the plurality of designated storage system components comprises respective ones of the plurality of designated storage system components providing a corresponding checkpoint time in response to the given I/O operation being processed by the respective designated storage system component. At least one of the one or more designated storage volumes may be created in response to an activation of the evaluation mode. The evaluating the time difference between the at least two checkpoint times, for the respective ones of the one or more of the plurality of I/O operations, may comprise generating at least one histogram of the time difference between the at least two checkpoint times for a plurality of the I/O operations and determining one or more of a minimum time difference, a maximum time difference and an average time difference using the at least one histogram.

In at least one embodiment, the one or more automated actions may comprise generating one or more notifications related to the one or more anomalous portions of the I/O path or another communication to one or more designated recipients regarding the one or more anomalous portions of the I/O path; generating one or more signals related to the one or more anomalous portions of the I/O path (for example, alerting another system of the one or more anomalous portions of the I/O path, providing identifiers of the designated storage system components associated with the one or more anomalous portions of the I/O path to a visualization system and/or enabling a display of the one or more anomalous portions of the I/O path and/or the identifiers of the designated storage system components associated with the one or more anomalous portions of the I/O path); and/or controlling a performance of at least one action in another system using the one or more anomalous portions of the I/O path (such as uploading identifiers of the designated storage system components associated with the one or more anomalous portions of the I/O path or otherwise storing the identifiers of the designated storage system components associated with the one or more anomalous portions of the I/O path in the other system and/or initiating an automated review of the one or more anomalous portions of the I/O path by the other system). For example, the automated actions may trigger a replacement, a reconfiguration and/or a supplementing of one or more of the designated storage system components associated with the one or more anomalous portions of the I/O path.

The particular processing operations and other network functionality described in conjunction with the flow diagrams of FIGS. 5 through 9 are presented by way of illustrative example only and should not be construed as limiting the scope of the disclosure in any way. Alternative embodiments can use other types of processing operations for identifying anomalous portions of I/O paths by monitoring checkpoints of I/O operations through a storage system. For example, the ordering of the process steps may be varied in other embodiments, or certain steps may be performed concurrently with one another rather than serially. In one aspect, the process can skip one or more of the steps. In other aspects, one or more of the steps are performed simultaneously. The processing of one or more of the steps can also be distributed between multiple components. In some aspects, additional steps can be performed.

In some embodiments, techniques are provided for identifying anomalous portions of I/O paths by monitoring checkpoints of I/O operations through a storage system. In at least some embodiments, the disclosed anomalous I/O path identification techniques reduce the time to perform a root cause analysis for storage system performance bottlenecks.

One or more embodiments of the disclosure provide improved methods, apparatus and computer program products for identifying anomalous portions of I/O paths by monitoring checkpoints of I/O operations through a storage system. The foregoing applications and associated embodiments should be considered as illustrative only, and numerous other embodiments can be configured using the techniques disclosed herein, in a wide variety of different applications.

It should also be understood that the disclosed anomalous I/O path identification techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for identifying anomalous portions of I/O paths by monitoring checkpoints of I/O operations through a storage system may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based anomalous I/O path identification processing engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based anomalous I/O path identification processing platform in illustrative embodiments. The cloud-based systems can include block storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
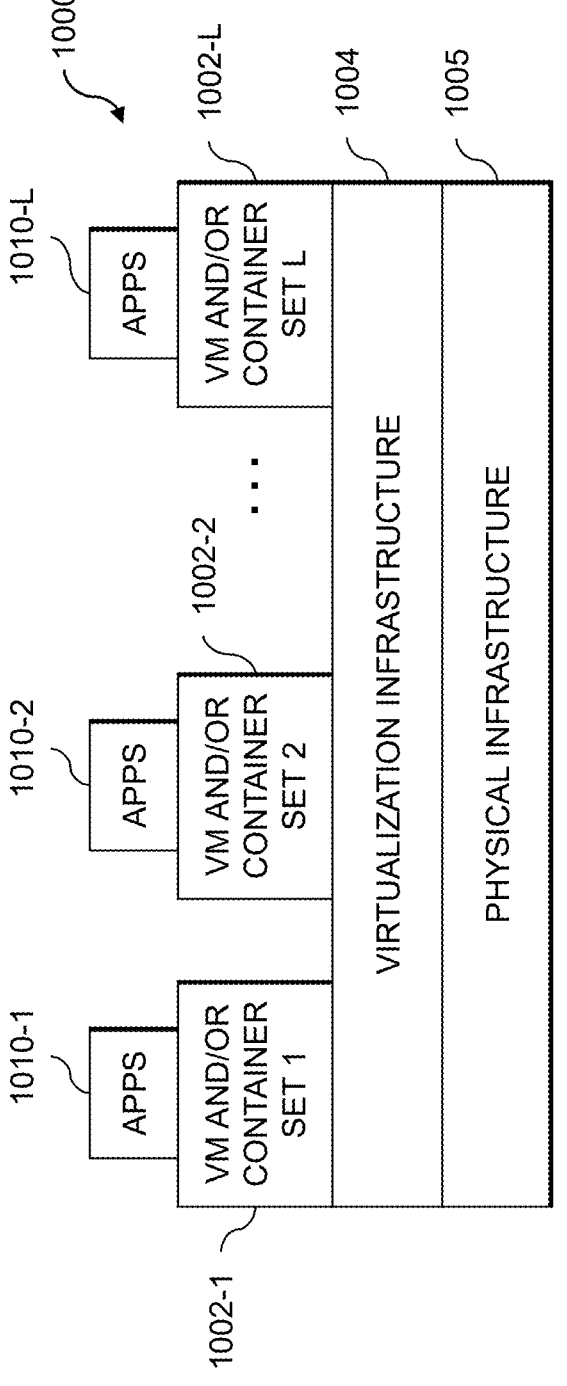
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of an information processing system. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide anomalous I/O path identification functionality of the type described above for one or more processes running on a given one of the VMs. For example, each of the VMs can implement I/O operation checkpointing control logic and associated functionality for evaluating time differences between checkpoint times to identify anomalous portions of an I/O path.

An example of a hypervisor platform that may be used to implement a hypervisor within the virtualization infrastructure 1004 is a compute virtualization platform which may have an associated virtual infrastructure management system such as server management software. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide anomalous I/O path identification functionality of the type described above for one or more processes running on different ones of the containers. For example, a container host device supporting multiple containers of one or more container sets can implement one or more instances of I/O operation checkpointing control logic and associated functionality for evaluating time differences between checkpoint times to identify anomalous portions of an I/O path.

As is apparent from the above, one or more of the processing modules or other components of the information processing system may each run on a computer, server, storage device or other processing platform element. A given such element may be viewed as an example of what is more generally referred to herein as a processing device. The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
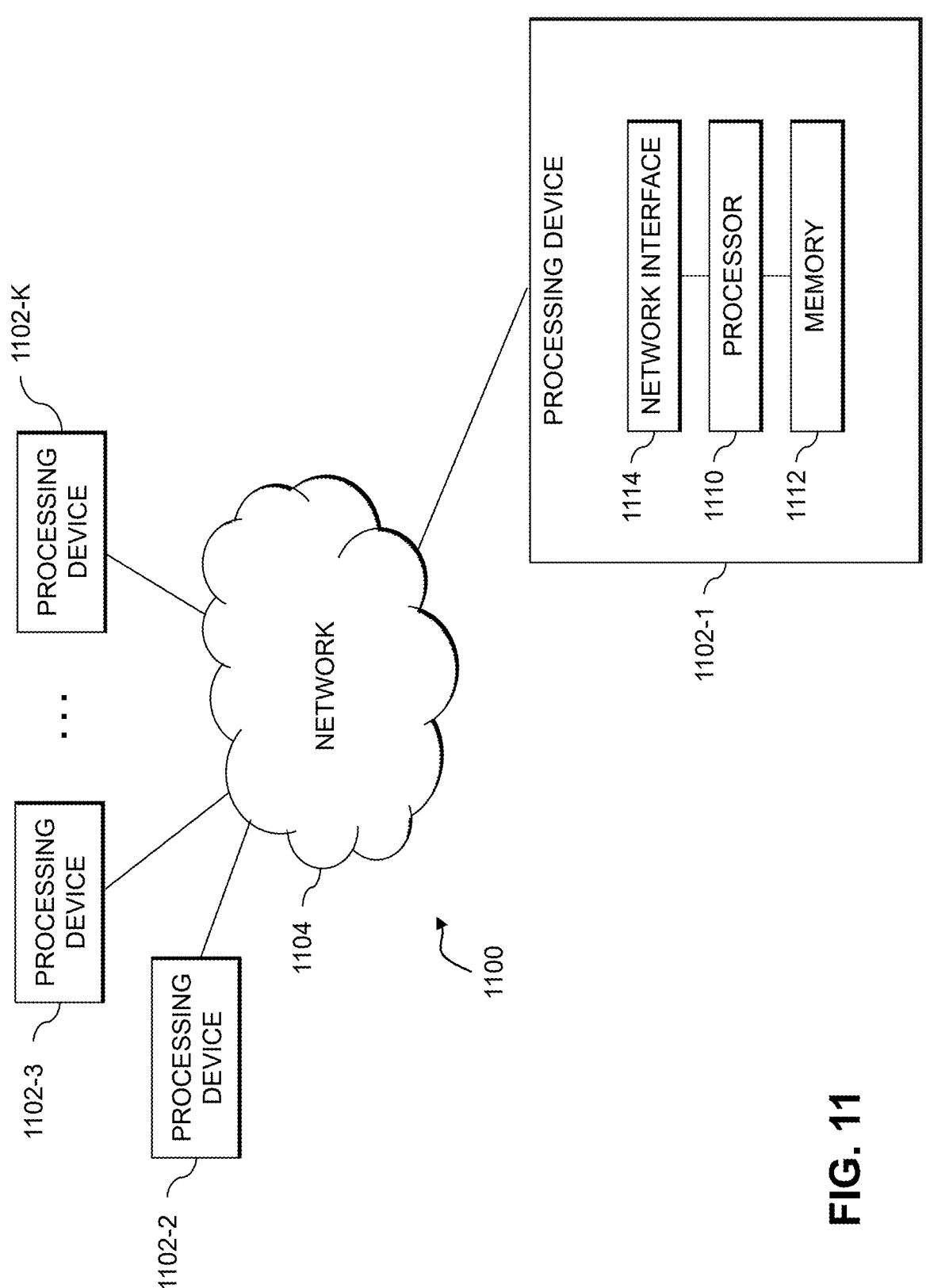
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining checkpoint data associated with one or more designated storage volumes in a storage system, wherein the storage system comprises a plurality of designated storage system components, wherein the checkpoint data is associated with a plurality of input/output (I/O) operations that are processed by the plurality of designated storage system components and wherein the checkpoint data for a given I/O operation comprises a plurality of checkpoint times indicating one or more respective times that the given I/O operation is processed by a corresponding designated storage system component;
evaluating a time difference between at least two checkpoint times, for one or more of the plurality of I/O operations, to identify one or more anomalous portions of an I/O path between the designated storage system components associated with the at least two checkpoint times, wherein the at least two checkpoint times are associated with different ones of the plurality of designated storage system components; and
initiating one or more automated mitigation actions related to the designated storage system components associated with the one or more anomalous portions of the I/O path, wherein the one or more automated mitigation actions trigger one or more of a replacement, a reconfiguration and a supplementing of one or more of the designated storage system components associated with the one or more anomalous portions of the I/O path;
wherein the method is performed by at least one processing device comprising a processor coupled to a memory.

2. The method of claim 1, wherein the checkpoint data associated with the one or more designated storage volumes is obtained in an evaluation mode that generates the plurality of I/O operations to at least one of the one or more designated storage volumes and monitors the processing of the plurality of I/O operations by the plurality of designated storage system components.

3. The method of claim 2, wherein the monitoring of the processing of a given one of the plurality of I/O operations by a given one of the plurality of designated storage system components comprises the given designated storage system component appending a corresponding checkpoint time in response to the given I/O operation being processed by the given designated storage system component.

4. The method of claim 3, wherein the given I/O operation has associated user data and wherein the given designated storage system component appends the corresponding checkpoint time in the user data.

5. The method of claim 2, wherein the monitoring of the processing of the plurality of I/O operations by the plurality of designated storage system components comprises one or more of the plurality of designated storage system components providing a corresponding checkpoint time in response to the given I/O operation being processed by the respective designated storage system component.

6. The method of claim 2, further comprising creating at least one of the one or more designated storage volumes in response to an activation of the evaluation mode.

7. The method of claim 1, wherein the evaluating the time difference between the at least two checkpoint times, for the one or more of the plurality of I/O operations, comprises generating at least one histogram of the time difference between the at least two checkpoint times for a plurality of the I/O operations and determining one or more of a minimum time difference, a maximum time difference and an average time difference using the at least one histogram.

8. An apparatus comprising:

at least one processing device comprising a processor coupled to a memory;

the at least one processing device being configured to implement the following steps:

obtaining checkpoint data associated with one or more designated storage volumes in a storage system, wherein the storage system comprises a plurality of designated storage system components, wherein the checkpoint data is associated with a plurality of input/output (I/O) operations that are processed by the plurality of designated storage system components and wherein the checkpoint data for a given I/O operation comprises a plurality of checkpoint times indicating one or more respective times that the given I/O operation is processed by a corresponding designated storage system component;

evaluating a time difference between at least two checkpoint times, for one or more of the plurality of I/O operations, to identify one or more anomalous portions of an I/O path between the designated storage system components associated with the at least two checkpoint times, wherein the at least two checkpoint times are associated with different ones of the plurality of designated storage system components; and initiating one or more automated mitigation actions related to the designated storage system components associated with the one or more anomalous portions of the I/O path, wherein the one or more automated mitigation actions trigger one or more of a replacement, a reconfiguration and a supplementing of one or more of the designated storage system components associated with the one or more anomalous portions of the I/O path.

9. The apparatus of claim 8, wherein the checkpoint data associated with the one or more designated storage volumes is obtained in an evaluation mode that generates the plurality of I/O operations to at least one of the one or more designated storage volumes and monitors the processing of the plurality of I/O operations by the plurality of designated storage system components.

10. The apparatus of claim 9, wherein the monitoring of the processing of a given one of the plurality of I/O operations by a given one of the plurality of designated storage system components comprises the given designated storage system component appending a corresponding checkpoint time in response to the given I/O operation being processed by the given designated storage system component.

11. The apparatus of claim 10, wherein the given I/O operation has associated user data and wherein the given designated storage system component appends the corresponding checkpoint time in the user data.

12. The apparatus of claim 9, wherein the monitoring of the processing of the plurality of I/O operations by the plurality of designated storage system components comprises one or more of the plurality of designated storage system components providing a corresponding checkpoint time in response to the given I/O operation being processed by the respective designated storage system component.

13. The apparatus of claim 9, further comprising creating at least one of the one or more designated storage volumes in response to an activation of the evaluation mode.

14. The apparatus of claim 8, wherein the evaluating the time difference between the at least two checkpoint times, for the one or more of the plurality of I/O operations, comprises generating at least one histogram of the time difference between the at least two checkpoint times for a plurality of the I/O operations and determining one or more of a minimum time difference, a maximum time difference and an average time difference using the at least one histogram.

15. A non-transitory processor-readable storage medium having stored therein program code of one or more software programs, wherein the program code when executed by at least one processing device causes the at least one processing device to perform the following steps:

obtaining checkpoint data associated with one or more designated storage volumes in a storage system, wherein the storage system comprises a plurality of designated storage system components, wherein the checkpoint data is associated with a plurality of input/output (I/O) operations that are processed by the plurality of designated storage system components and wherein the checkpoint data for a given I/O operation comprises a plurality of checkpoint times indicating one or more respective times that the given I/O operation is processed by a corresponding designated storage system component;

evaluating a time difference between at least two checkpoint times, for one or more of the plurality of I/O operations, to identify one or more anomalous portions of an I/O path between the designated storage system components associated with the at least two checkpoint times, wherein the at least two checkpoint times are associated with different ones of the plurality of designated storage system components; and initiating one or more automated mitigation actions related to the designated storage system components associated with the one or more anomalous portions of the I/O path, wherein the one or more automated mitigation actions trigger one or more of a replacement, a reconfiguration and a supplementing of one or more of the designated storage system components associated with the one or more anomalous portions of the I/O path.

16. The non-transitory processor-readable storage medium of claim 15, wherein the checkpoint data associated with the one or more designated storage volumes is obtained in an evaluation mode that generates the plurality of I/O operations to at least one of the one or more designated storage volumes and monitors the processing of the plurality of I/O operations by the plurality of designated storage system components.

17. The non-transitory processor-readable storage medium of claim 16, wherein the monitoring of the processing of a given one of the plurality of I/O operations by a given one of the plurality of designated storage system components comprises the given designated storage system component appending a corresponding checkpoint time in response to the given I/O operation being processed by the given designated storage system component.

18. The non-transitory processor-readable storage medium of claim 17, wherein the given I/O operation has associated user data and wherein the given designated storage system component appends the corresponding checkpoint time in the user data.

19. The non-transitory processor-readable storage medium of claim 16, wherein the monitoring of the processing of the plurality of I/O operations by the plurality of designated storage system components comprises one or more of the plurality of designated storage system components providing a corresponding checkpoint time in response to the given I/O operation being processed by the respective designated storage system component.

20. The non-transitory processor-readable storage medium of claim 16, further comprising creating at least one of the one or more designated storage volumes in response to an activation of the evaluation mode.

\* \* \* \* \*